United States Patent [19]

Kato

[11] Patent Number: 5,940,358

[45] Date of Patent: Aug. 17, 1999

[54] CD-R RECORDING CIRCUIT WITH FORMATTER TO INCREASE RATE OF GENERATING CONTROL SIGNALS

[75] Inventor: Keisuke Kato, Yamato Kanagawa, Japan

[73] Assignee: Cirrus Logic, Inc., Fremont, Calif.

[21] Appl. No.: 08/663,391

[22] Filed: Jun. 13, 1996

[51] Int. Cl.⁶ ........................................... G11B 7/00
[52] U.S. Cl. ........................ 369/84; 369/32; 369/48; 369/124
[58] Field of Search ........................ 369/84, 54, 58, 369/48, 32, 47, 124

[56] References Cited

U.S. PATENT DOCUMENTS

| | | | |
|---|---|---|---|
| 5,034,914 | 7/1991 | Osterlund | 364/900 |
| 5,224,087 | 6/1993 | Maeda et al. | 369/54 |
| 5,257,248 | 10/1993 | Ogasawara | 369/32 |
| 5,291,467 | 3/1994 | Ishiwata et al. | 369/44.28 |
| 5,311,492 | 5/1994 | Tabuchi et al. | 369/47 |
| 5,317,553 | 5/1994 | Ohga et al. | 369/54 |
| 5,367,510 | 11/1994 | Ando | 369/32 |
| 5,408,478 | 4/1995 | Ohmori et al. | 371/37.5 |
| 5,436,875 | 7/1995 | Shinada | 369/32 |
| 5,473,590 | 12/1995 | Yokota et al. | 369/59 |
| 5,499,224 | 3/1996 | Sanada | 369/48 |
| 5,508,988 | 4/1996 | Nonaka et al. | 369/32 |
| 5,508,989 | 4/1996 | Funahashi et al. | 369/58 |
| 5,561,644 | 10/1996 | Kondo | 369/32 |
| 5,563,862 | 10/1996 | Udagawa | 369/54 |
| 5,598,391 | 12/1996 | Mukawa | 369/54 |
| 5,721,856 | 2/1998 | Takeuchi | 369/32 |
| 5,741,579 | 4/1998 | Kazuno et al. | 369/124 |
| 5,812,502 | 9/1998 | Hirai et al. | 369/32 |

*Primary Examiner*—John W. Cabeca
*Assistant Examiner*—Kim-Kwok Chu
*Attorney, Agent, or Firm*—Robert P. Bell; Steven A. Shaw

[57] ABSTRACT

A CD-R controller for recording on a CD-R disk a signal representative of a set of signal data. The CD-R controller includes a buffer manager for receiving a command such as a CUE-sheet, and sends the command to a micro-controller. The micro-controller generates instructions corresponding to each command by using information stored in a ROM. The buffer manager stores the instructions in a buffer and then sends the instructions to a CD-R formatter. Buffer manager may then send signal data corresponding to the instructions to a recording circuit. CD-R formatter generates control signals to the recording circuit from the instructions. The control signals cause recording circuit to generate recording signals to a CD-R drive. The CD-R drive may record the signal representative of the signal data in response to the recording signals.

16 Claims, 4 Drawing Sheets

CD-R RECORDING CIRCUIT WITH FORMATTER TO INCREASE RATE OF GENERATING CONTROL SIGNALS

FIELD OF THE INVENTION

The present invention relates generally to a CD-R (Recordable Compact Disk) controller circuit for use in a computer system and more specifically to an improved method and apparatus for recording a signal representative of signal data on a CD-R disk.

BACKGROUND OF THE INVENTION

A computer system may include a recordable compact disk (CD-R) drive for recording a multi-media signal on a CD-R disk. Such a multi-media signal may include, for example, an audio signal, a video signal, graphics signals, data signals or the like, or a combination of audio, video, graphics or data signals. FIG. 1 is a block diagram of one such computer system 100 comprising CD-R drive 140. Host processor 110 may comprise a central processing unit such as a Pentium™ processor. Host processor 110 may send a multi-media signal encoded as signal data over bus 112. Bus 112 may comprise, for example, a PCI bus. Host processor 110 may also send commands to specify information required for recording the signal.

CD-R controller 130 may receive signal data (step 410 of FIG. 4) and commands from host processor 110 and generate recording signals on CD-R bus 134 to record on a CD-R disk a signal representative of signal data. Such commands may include, for example, what are known commonly in the industry as, CUE-sheets.

CD-R controller 130 may send commands to micro-controller 160, which in turn may generate a set of control signals to cause CD-R controller 130 to record on a CD-R disk a signal representative of signal data. CD-R controller 130 may store in buffer 170 signal data received from host processor 110. In response to control signals generated by micro-controller 160, CD-R controller 130 may retrieve signal data from buffer 170 and generate recording signals to record a signal representative of signal data on a CD-R disk located in CD-R drive 140.

To generate such control signals, micro-controller 160 may generate a table corresponding to each command (step 420 of FIG. 4) and generate control signals from the table. ROM 150 may store information used to generate such table, and micro-controller 160 may accordingly access ROM 150 to generate the table corresponding to a command. A table may contain information necessary for encoding signal data on several sectors during a recording operation.

In the prior art, micro-controller 160 may store in RAM 180 a table generated corresponding to each command (step 430 of FIG. 4). Micro-controller 160 may then access such a table from RAM 180, and generate control signals to CD-R controller 130 using information in the table (step 440 of FIG. 4). Due to such accesses, micro-controller 160 may potentially access RAM 180 to generate control signals for recording signal data on each sector.

One problem with such a prior art computer system 100 is that micro-controller 160 may not have enough through-put performance to support high-speed recording requirements of present day computer systems. Micro-controller 160 may not have enough throughput performance due to a high number of accesses micro-controller 160 may make to RAM 180 for accessing information in a table.

The throughput performance problems of micro-computer 160 may be exacerbated as micro-computer 160 may have several other functions such as servo functions while accessing a CD-R disk. Such other functions may consume several cycles of micro-computer 160 time. In addition, time interval between recording data on two sectors may be reduced with faster CD-R drive 140 in modern computer system 100, and micro-computer 160 may accordingly be required to generate control signals at an increasingly faster rate.

Due to the throughput performance problems and consequent inability to generate control signals at a sufficient speed, micro-computer 160 may be unable to generate control signals at a rate corresponding to a rate at which signal data may be received by CD-R controller 130. Due to such inability, CD-R controller 130 may miss recording a portion of signal data on a CD-R disk located in CD-R drive 140. As is well appreciated in the art, rewriting (or going back to record missed portions of signal data) over a CD-R disk may not be possible due to technological limitations. The quality of recorded signal may therefore be unacceptable.

SUMMARY OF THE INVENTION

The present invention is described in the context of a CD-R controller used in a computer system. The CD-R controller may generate recording signals to record on a CD-R disk a signal representative of a set of signal data received from a host processor. The CD-R controller circuit may comprise a host interface circuit for receiving the set of signal data and a command from the host processor. A buffer manager may receive the signal data and the command from the host interface circuit, and send the command to a micro-controller.

The micro-controller may generate a set of instructions corresponding to the command and send the instructions to the buffer manager. The CD-R controller may further include a recording circuit for generating a set of recording signals for recording on the CD-R disk the signal representative of the signal data.

A formatter circuit of the present invention may generate a set of control signals from each of the set of instructions. The set of control signals may cause the recording circuit to generate the set of recording signals. As the formatter circuit in CD-R controller generates the control signals, performance bottlenecks in the micro-controller may not adversely affect the recording of the signals.

The computer system may further comprise a buffer coupled to the buffer manager. The buffer manager may receive the set of instructions from the micro-controller and store the set of instructions in the buffer. The formatter may then receive the instructions from the buffer and generate the set of control signals. The command in the present invention may comprise a CUE-sheet.

The CD-R controller circuit of the present invention may comprises an ATIP decoder and search logic coupled to the formatter circuit. The ATIP decoder and search logic may generate an address of a sector on the CD-R disk, and the formatter may use the address to record the signal at the address to record at the sector.

The CD-R controller may further comprise an encoder circuit for encoding the signal data in a C1/C2 format to generate an encoded data. A modulator may modulate the encoded data into eight-to-fourteen mode format.

The CD-R controller may further comprise a digital signal processing (DSP) circuit for demodulating the signal recorded on the CD-R disk to generate a demodulated data. The DSP circuit may decode the demodulated data to generate the signal data. A correction circuit may correct errors in the signal data according to a pre-determined error correction code.

DETAILED DESCRIPTION OF THE INVENTION

Figure 2:
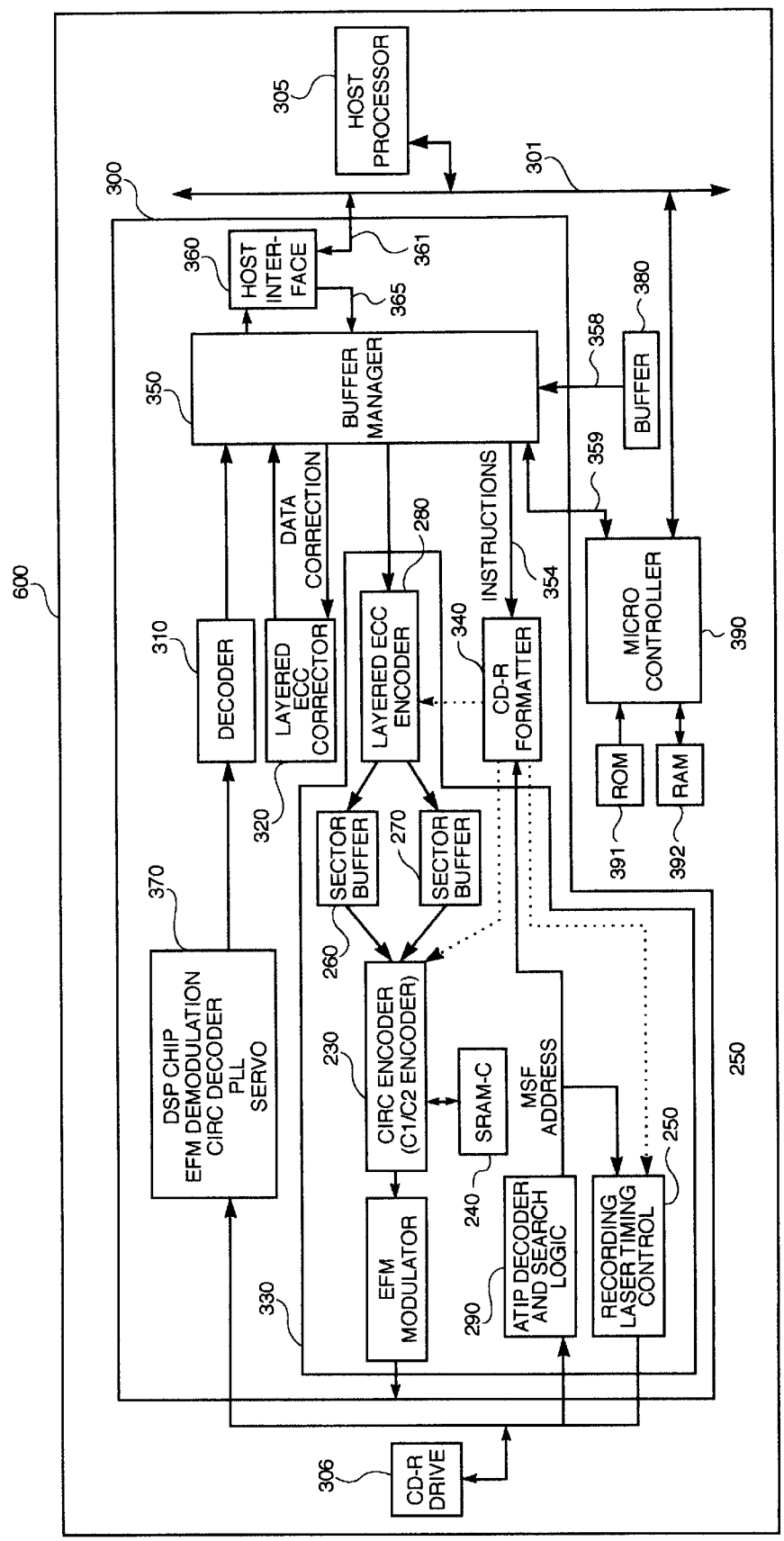
FIG. 2 is a block diagram of the computer system of the present invention including a CD-R formatter and a recording circuit.

Referring to FIG. 2, computer system 600 of the present invention may comprise micro-controller 390 which may generate a set of instructions corresponding to a command (such as a CUE-sheet), and send the instructions to recordable compact disk (CD-R) controller 300 over bus 359. CD-R controller 300 may buffer such instructions in buffer 380. Micro-controller 160 may start CD-R formatter 340 which may cause CD-R formatter 340 to generate a request for instructions to buffer manager 350. In response, buffer manager 350 may send a steady stream of instructions to CD-R formatter 340. CD-R formatter 340 may in turn generate control signals to CD-R drive 306 from the instructions. The control signals may cause CD-R drive 306 to record a signal representative of signal data on a CD-R disk.

Figure 1:
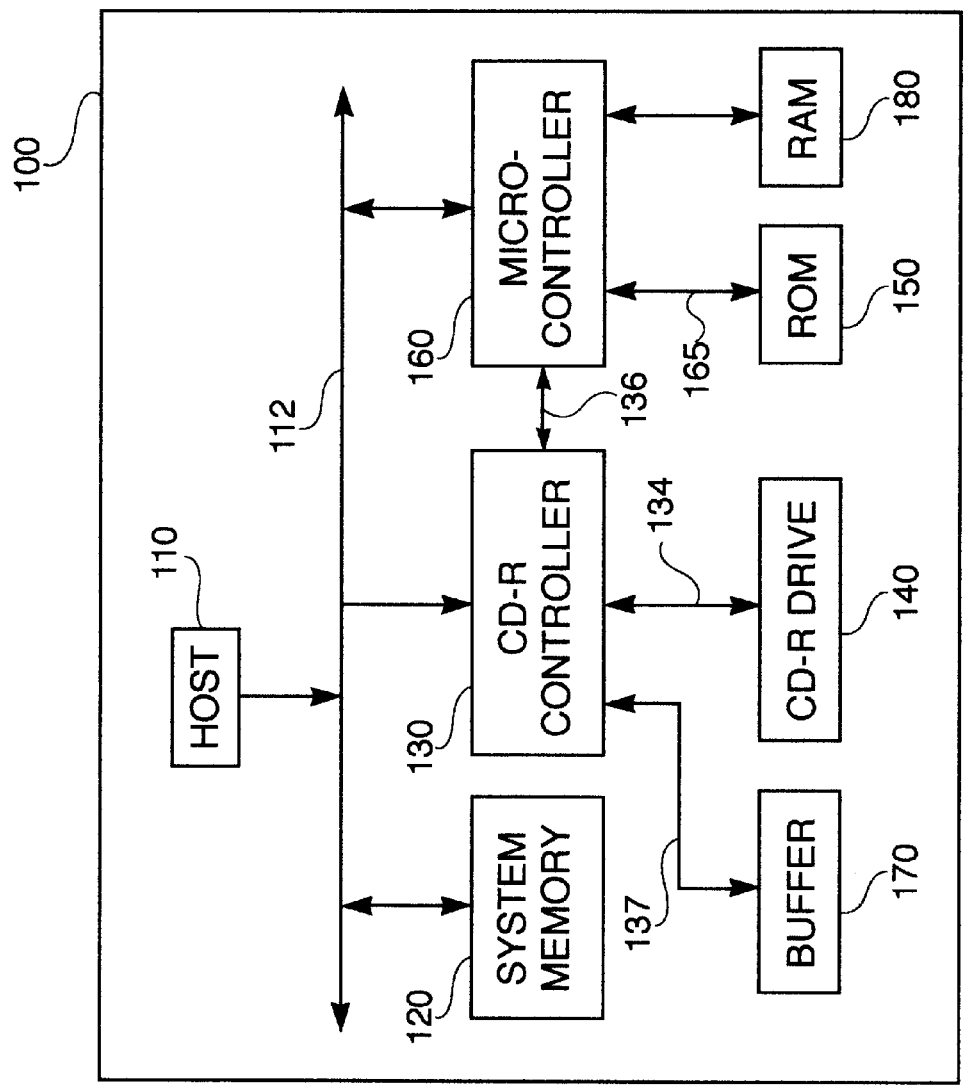
FIG. 1 is a block diagram of a prior art computer system comprising a CD-R controller, a host processor, a CD-R drive, a micro-controller, a RAM and a ROM.

As CD-R formatter 340 generates control signals for a recording operation, micro-controller 390 may not be a performance bottleneck as in a prior art computer system 100 of FIG. 1. The throughput performance of CD-R controller 300 of the present invention may accordingly be enhanced. As a result, CD-R controller 300 may not miss recording signal data due to performance bottlenecks in micro-controller 390.

Figure 5:
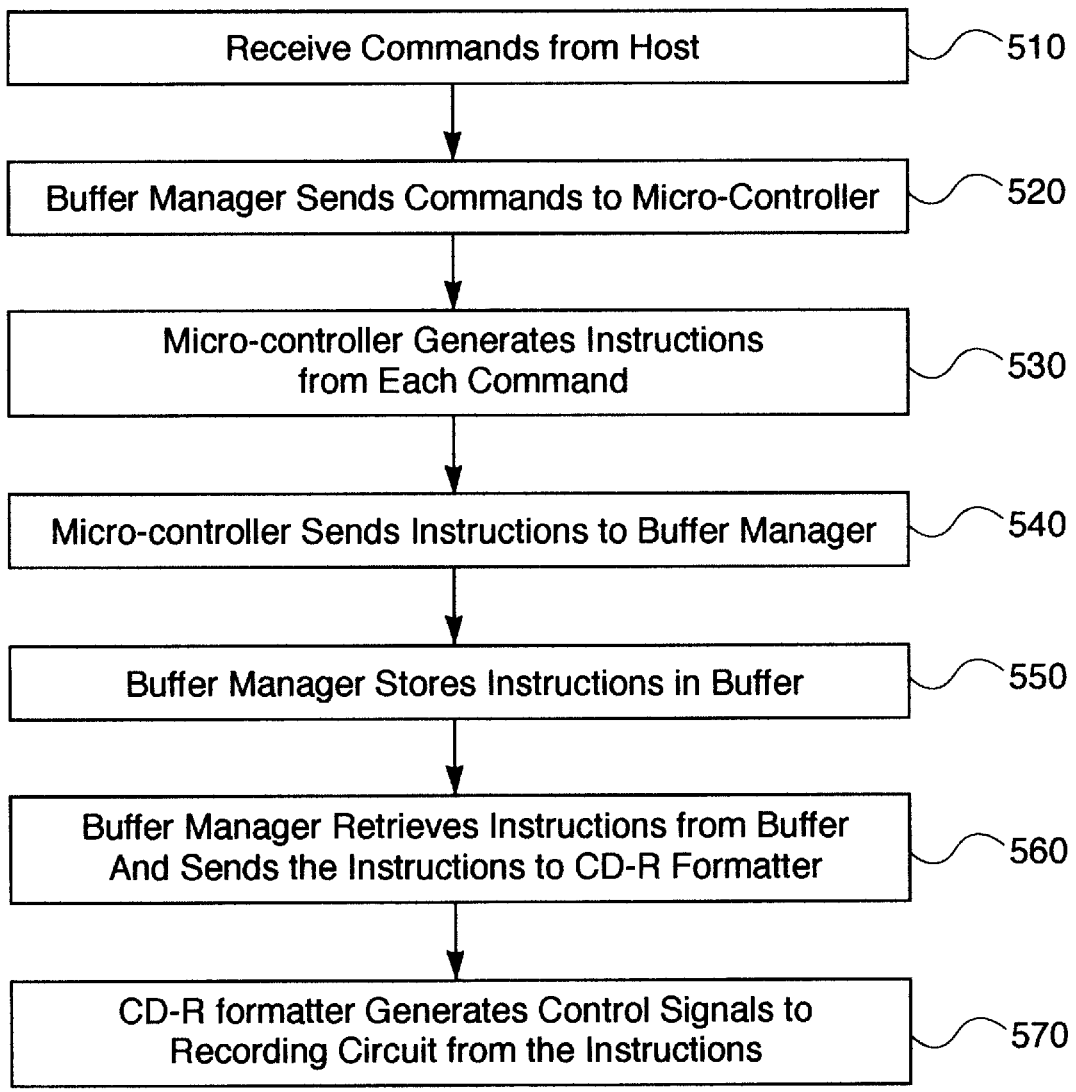
FIG. 5 is a flow-chart illustrating the method employed by the computer system of the present invention in recording on a CD-R disk a signal received from a host representative of signal data.

Referring now to FIGS. 2 and 5, CD-R controller 300 may perform a recording function in accordance with a flow-chart shown in FIG. 5. CD-R controller 300 may comprise CD-R formatter 340 for receiving a set of instructions from buffer manager 350 and generating control signals to recording circuit 330. The control signals may cause recording circuit 330 to record a signal on a CD-R disk located in CD-R drive 306. As micro-controller 390 may not generate control signals to recording circuit 330, potential performance bottlenecks in micro-controller 390 may not adversely impact the throughput performance of CD-R controller 300.

Host interface 360 may receive signal data and commands from host processor 305 over bus 361 in step 510. Buses 361 and 301 may comprise several buses such as a system bus, peripheral buses and the like. The received commands may include CUE-sheet commands as in the prior art. Host interface 360 may use a conventional standard such as a small computers systems interface (SCSI) or ATAPI to receive commands and data over bus 361. Host interface 360 may send signal data and commands over bus 365.

Buffer manager 360 may receive commands and signal data over bus 365, and store the received signal data in buffer 380 over bus 358. Buffer manager 360 of the present invention may further send commands to micro-controller 390 over bus 359 in step 520. In step 530, micro-controller 390 may generate a set of instructions from each command by accessing contents of ROM 391.

However, micro-controller 390 of the present invention may send the generated instructions to buffer manager 350 in step 540. Hence, micro-controller 390 in the present invention may not generate all control signals to CD-R controller 300 as in prior art, but merely send instructions to buffer manager 360 instead. As micro-controller 390 may not generate such control signals, micro-controller 390 may no longer be a performance bottleneck in computer system 100 as in the prior art.

Buffer manager 360 may receive instructions from micro-controller 390, and store the received instructions in buffer 380 in step 550. Buffer manager 350 may then retrieve instructions from buffer 380, and send the instructions to CD-R formatter 340 in step 560. Buffer manager 350 may also retrieve signal data from buffer 380 and send the signal data to recording circuit 330.

Buffer 380 may comprise a DRAM of up to 16 Mbyte capacity. In a preferred embodiment, buffer 380 may comprise a 1 Mbyte DRAM. Buffer 380 may store instructions and signal data. Buffer manager 350 may comprise internal registers to identify memory locations where commands and signal data are respectively stored in buffer 380. Buffer manager 350 may use data stored in such registers to store and read instructions and signal data.

In step 570, CD-R formatter 340 may generate control signals to recording circuit 330 from the instructions received from buffer manager 360. Such control signals may cause recording circuit 330 to record a signal representative of signal data. CD-R formatter 340 may receive an address of a sector over bus 254, and CD-R formatter 340 may accordingly generate control signals to write signal data in the corresponding sector.

CD-R formatter 340 may receive several instructions in a burst from buffer manager 350, and may therefore timely generate control signals as signal data is received by encoder 280. As bus 358 may provide a high speed interface between buffer 380 and buffer manager 350, buffer manager 350 may provide instructions at a sufficiently high rate to CD-R formatter 340. In a preferred embodiment, CD-R controller 130, micro-controller 160, RAM 180, ROM 150, CD-R drive 140 and buffer 170 may be integrated into a single unit termed as a CD-R drive system.

Continuing with reference to FIG. 2, a preferred embodiment of recording circuit 330 may comprise layered ECC (error correction code) encoder 280, sector buffers 270 and 260, CIRC encoder 230, EFM modulator 220, ATIP decoder and search logic 290 and recording laser timing control 250. It will however be appreciated that several alternate embodiments of recording circuit 330 may be implemented without departing from scope and spirit of the present invention.

Layered ECC encoder 280 may encode signal data according to a format specified by CD-R formatter 340 to generate data (hereinafter referred to as sector data) to be stored in sectors of a CD-R disk. The format may, in turn, be specified by an instruction received by CD-R formatter 340. The format may be one of yellow-book format, red book format, green book format and orange book format which are all well-known in the art. Such formats may be particularly designed to encode signals typically present in computers. Further information on such formats may be obtained from Philips Consumer Electronics, 5600 MD Eindhoven, The Netherlands, and Sony Corporation, 6-7-35 Kitashinagawa, Shinagawa-ku, Tokyo, Japan.

The formats may also specify a corresponding error correction code. In a preferred embodiment, layered ECC encoder 280 may employ a layered error correction coding (ECC) scheme. Such an ECC scheme may allow signal data to be stored and retrieved from a CD-R disk within a required error rate. Sector buffers 260 and 270 may each comprise an SRAM for buffering sector data when encoder 280 encodes signals data.

CIRC encoder 230 may encode output data generated by layered ECC encoder 280 into digital audio data (for example, red book format). CIRC encoder 230 may perform such additional encoding to be backward compatible with CD Digital Audio Technology. CIRC encoder 230 may generate additional bytes required for error correction codes in recording audio data. SRAM 240 may serve as a buffer for storing intermediate data as CIRC encoder 230 encodes output data generated by layered ECC encoder 280.

In a preferred embodiment, CIRC encoder 230 may use C1/C2 encoding scheme (Red Book) well known in the art. C1/C2 encoding may allow signal data to be reproduced at an error rate sufficient for encoding audio data in traditional audio-CDs. However, a layered encoding scheme implemented in layered ECC encoder 280 may allow signal reproduction at a lower error rate, and may be acceptable for computer applications.

Modulator 220 may generate eight-to-fourteen modulation (EFM) data from the data encoded by CIRC encoder 230. Modulator 220 may also generate clock signals for recording a signal on a CD-R disk located in CD-R drive 306. CD-R formatter may also generate control signals to recording laser timing control circuit 250. Such control signals may cause a recording laser circuit in CD-R drive 306 to be turned ON during periods when a signal is to be recorded. The operation of modulator 220 may be coordinated with the operation of recording laser timing control circuit 250.

ATIP (Absolute Time in Pre-Groove) decoder and search logic 290 in the present invention provides to CD-R formatter 340 address information of a sector on a CD-R disk. Such address information may be needed for a CD-R disk as CD-R disk may not have address information recorded unlike in conventional CD-ROM disks. In a preferred embodiment, users of computer system 100 may be able to program a target sector address.

In the prior art, micro-controller 160 may receive such address information and generate control signals based on the information received. Hence, CD-R formatter 340 of the present invention further relieves micro-controller 390 of additional tasks, thereby preventing micro-controller 390 from being a performance bottleneck in computer system 600.

CD-R controller 300 of the present invention may further comprise DSP (Digital Signal Processing) circuit 370, decoder 310 and layered ECC corrector 320 for decoding signals recorded on CD-R (or CD-ROM) disks. It may be appreciated that CD-R controller 300 records signal data on a CD-R disk in CD-ROM (or audio) format, and may therefore decode signals either from CD-R disks or CD-ROM disks.

While decoding a signal on a CD-R disk, DSP circuit 370 may perform several functions such as EFM demodulation, CIRC decoding, and servo functions. As may be appreciated by one skilled in the art, demodulation and CIRC decoding may correspond to inverse-functions of modulator 220 and CIRC encoder 230 respectively. In one embodiment, DSP circuit 370 may be implemented as a separate chip.

Decoder 310 may decode output data generated by DSP circuit 370 to generate signal data. Layered ECC corrector 320 may correct errors in the decoded signal data by using a layered ECC scheme. Such errors may have been introduced while recording or storing or transferring signals data during recording or retrieving. Layered ECC encoder 280 may have earlier generated additional information required for such error correction as explained above.

Therefore, CD-R controller 300 may record a signal from signal data and generate signal data from a recorded signal. CD-R formatter 340 may generate control signals from instructions to recording circuit 330 for recording a signal.

Figure 3:
FIG. 3 is a diagram illustrating the format of an instruction used by a CD-R formatter of the present invention to generate control signals to a recording circuit.
Figure 4:
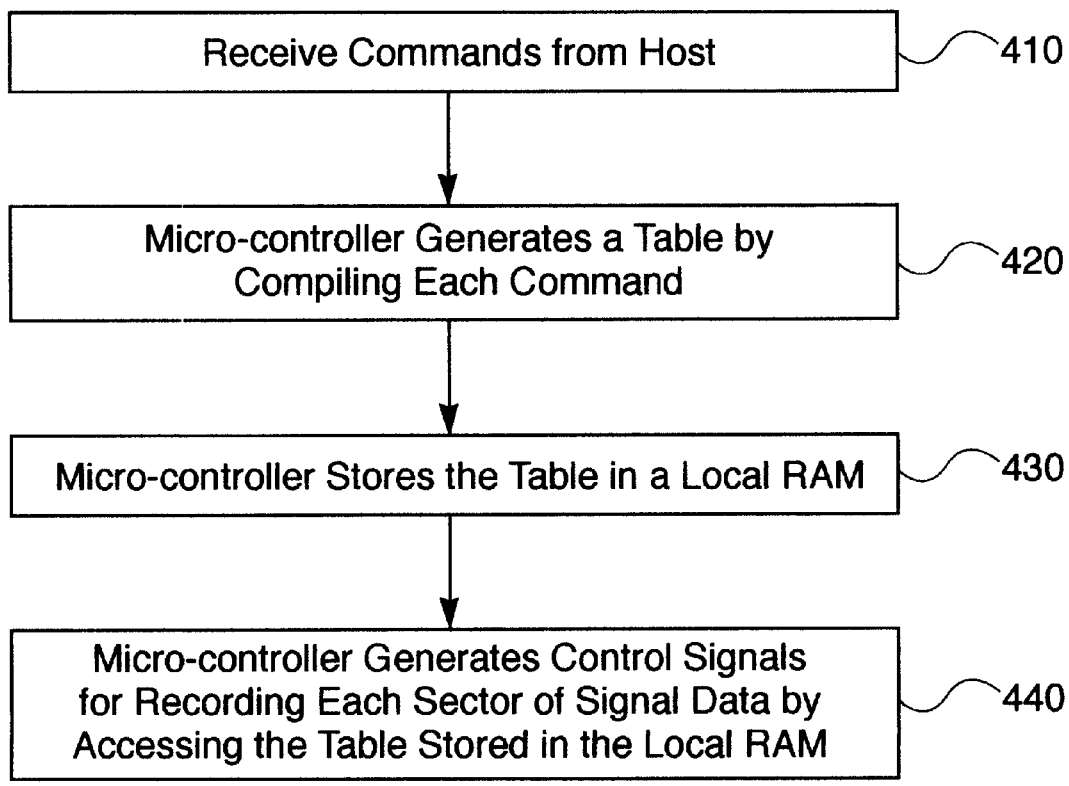
FIG. 4 is a flow-chart illustrating a prior art method employed by a computer system in recording on a CD-R disk a signal representative of signal data.

FIG. 3 is a diagram of instruction 600 illustrating an instruction format used by CD-R controller 300 of the present invention. In a preferred embodiment, each instruction may comprise 16 bytes. Bytes 0 and 1 (16-bits together) of instruction 600 may specify a number of sectors of signal data which may be recorded according to instruction 600.

CD-R formatter 340 may therefore generate control signals for a number of sectors of signal data from instruction 600. Therefore, CD-R controller 300 of the present invention may not rely on micro-controller 390 to generate control signals for each sector. As a result, performance throughput limitations in micro-controller 390 may not hinder the recording throughput performance of CD-R controller 300.

If bit 7 of byte 2 is set to 0, instruction 600 may use 19-bits for specifying such number of sectors. The 3 additional bits may be provided by an external register. Bits 0–3 of byte 2 may be used to control formatting a CD-R disk. Such control functions may include generating interrupts while formatting a first sector or a last sector corresponding to instruction 600.

Byte 3 may control encoding of the main channel on a CD-R disk. Bits 0–2 may be used to specify a sector type (E.g., yellow-book, red book). Bit 4 may specify a source (for example, buffer 380 starting at a memory location pointed to by a pre-determined register) of signal data for main channel. Bit 5 may specify whether to load sector header information from an another register or to merely increment prior sector header information. Bit 6 may be used to enable or disable layered ECC encoding. The disabling feature may be provided for test purposes.

Bytes 4 and 5 may control transfer of signal data corresponding to the main channel of a CD-R disk. A bit each in byte 4 may specify whether or not to retrieve data from buffer 380 for fields (in a sector) such as a sync mark field, header field, sub-header field, data field, ECC field. Each of corresponding bits in byte 5 may specify whether to overwrite data in such fields. The fields may be overwritten either with a fixed pattern or with data from a pre-specified register.

If a bit corresponding to header in byte 5 is set to 1, byte 6 may provide data to overwrite the header. Bytes 7 and 8 may control sub-code encoding. The bits may specify information such as sub-code data transfer type, sub-Q encode mode, sub-P encode mode.

Byte 15 may control insertion of four sub-Q IDs (0, 1, 2 and 3). The IDs may include information such as International Serial Recording Code (ISRC), catalogue number, drive ID code, copyright protection code. The bits may specify whether a corresponding sub-Q ID insertion is to be enabled. Each of bytes 11–14 may specify a sub-Q ID index for an ID. The index may be used to compute a memory location in buffer 380 which stores the data for the sub-Q ID. A more detailed description of the instruction format is provided in chapter 9 of the book entitled "Shakaru CL-CR3560—Rev. A, SCSI CD-R Encoder/Decoder", and is hereby included as Appendix A.

Therefore, using the information in instruction 600, CD-R formatter 340 may generate control signals to recording circuit 330. Recording circuit 330 may encode signal data according to the control signals, and record a signal on a CD-R disk. Such a signal may correspond to signal data received from host processor 305. As CD-R formatter 340 may be designed to primarily generate control signals to recording circuit 330, CD-R formatter 340 may generate control signals at a high enough rate to record signal data received at high rates. Thus, all of signal data may be recorded, and the quality of recorded signal may be acceptable.

Although the present invention has been illustrated and described in detail, it is clearly understood that the same is by way of illustration and example only and is not to be taken by way of limitation, the scope and spirit of the present invention being limited only by the terms of the appended claims.

What is claimed is:

1. A recordable compact disk controller for use in a computer system, the recordable compact disk for recording a signal representative of a set of signal data on a CD-R disk, the recordable compact disk controller comprising:
    a host interface circuit for receiving the set of signal data and a command from a host processor comprised in the computer system;
    a buffer manager coupled to said host interface circuit, said buffer manager sending the command to a micro-controller comprised in the computer system, the micro-controller for generating a set of instructions corresponding to the command;
    a recording circuit for generating a set of recording signals for recording on the CD-R disk the signal representative of the set of signal data; and
    a formatter circuit coupled to said recording circuit and said micro-controller, said formatter circuit generating a set of control signals from each of the set of instructions, wherein the set of control signals cause said recording circuit to generate the set of recording signals.

2. The recordable compact disk controller of claim 1 wherein the computer system comprises a buffer, wherein the buffer is coupled to said buffer manager, and wherein said buffer manager receives the set of instructions from the micro-controller and stores the set of instructions in said buffer, and wherein said formatter receives the instructions from the buffer and then generates the set of control signals.

3. The recordable compact disk controller of claim 2 wherein the command comprises a CUE-sheet.

4. The recordable compact disk controller of claim 1 wherein said recording circuit comprises an ATIP decoder and search logic coupled to said formatter circuit, said ATIP decoder and search logic generating an address of a sector on the CD-R disk, said formatter using the address to record the signal at the sector.

5. The recordable compact disk controller of claim 4 wherein said recording circuit further comprises:
    an encoder circuit for encoding the signal data in a C1/C2 format to generate an encoded data; and
    a modulator for modulating the encoded data into eight-to-fourteen mode format.

6. The recordable compact disk controller of claim 5 wherein the computer system comprises a buffer coupled to said buffer manager, and wherein said buffer manager receives the set of instructions from the micro-controller and stores the set of instructions in said buffer, and wherein said formatter receives the instructions from the buffer and then generates the set of control signals, and wherein said instructions comprise a CUE-sheet instruction.

7. The recordable compact disk controller of claim 6 further comprising:
    a digital signal processing (DSP) circuit for demodulating the signal recorded on the CD-R disk to generate a demodulated data, said DSP circuit decoding the demodulated data to generate the signal data; and
    a correction circuit to correct errors in the signal data according to a pre-determined error correction code.

8. A computer system for recording on a CD-R disk a signal representative of a set of signal data according to a command, the computer system comprising:
    a host processor for sending the set of signal data;
    a CD-R drive for receiving the CD-R disk;
    a micro-controller for generating a set of instructions from the command;
    a buffer for storing the instructions; and
    a recordable compact disk controller for generating a set of control signals to cause said CD-R drive to record the signal on said CD-R disk, said recordable compact disk controller receiving the set of signal data and the command from said host processor, said recordable compact disk controller recording the signal according to the command, said recordable compact disk controller comprising:
        a host interface circuit for receiving the set of signal data and the command from said host processor;
        a buffer manager coupled to said host interface circuit, said buffer manager sending the command to said micro-controller, and wherein said micro-controller generates a set of instructions corresponding to the command;
        a recording circuit coupled to said CD-R drive, said recording circuit generating the set of recording signals; and
        a formatter circuit coupled to said recording circuit, said formatter circuit generating the set of control signals from each of the set of instructions, wherein the set of control signals cause said recording circuit to generate the set of recording signals.

9. The computer system of claim 8 wherein the buffer is coupled to said buffer manager, and wherein said buffer manager receives the set of instructions from the micro-controller and stores the set of instructions in said buffer, and wherein said formatter receives the instructions from the buffer and then generates the set of control signals.

10. The computer system of claim 9 wherein the command comprises a CUE-sheet.

11. The computer system of claim 8 wherein said recording circuit comprises an ATIP decoder and search logic coupled to said formatter circuit, said ATIP decoder and search logic generating an address of a sector on the CD-R disk, said formatter using the address to record the signal at the sector.

12. The computer system of claim 11 wherein said recording circuit further comprises:
    an encoder circuit for encoding the signal data in a C1/C2 format to generate an encoded data; and
    a modulator for modulating the encoded data into eight-to-fourteen mode format.

13. The computer system of claim 8 further comprising:
a digital signal processing (DSP) circuit for demodulating the signal recorded on the CD-r disk to generate a demodulated data, said DSP circuit decoding the demodulated data to generate the signal data; and
a correction circuit to correct errors in the signal data according to a pre-determined error correction code.

14. A method of recording a signal representative of a set of signal data on a CD-R disk located in a CD-R drive, the method comprising the steps of:
receiving the set of signal data and a command from the host processor;
sending the command to a micro-controller,
generating in the micro-controller a set of instructions corresponding to the command;
sending the set of instructions to a formatter;
generating in the formatter a set of control signals from each of the set of instructions;
sending the set of control signals to a recording circuit, the set of control signals causing the recording circuit to generate a set of recording signals; and
coupling the recording signals to the CD-R drive, wherein the recording signals cause the CD-R drive to record the signal on the CD-R disk.

15. The method of step 14 further comprising the step of storing the set of instructions in a buffer, wherein the set of instructions stored in the buffer are provided to the step of generating in the formatter a set of control signals.

16. The method of claim 15 further comprising the steps of:
generating an address in an ATIP decoder and search logic, the address corresponding to a sector of the CD-R disk;
providing the address to the step of generating in the formatter, wherein the step of generating in the formatter generates control signals to cause the signal to be recorded at the address.

* * * * *